US008691421B2

(12) United States Patent
Lee et al.

(10) Patent No.: US 8,691,421 B2
(45) Date of Patent: Apr. 8, 2014

(54) BATTERY MODULE HAVING FLEXIBILITY IN DESIGNING STRUCTURE OF MODULE AND BATTERY PACK EMPLOYED WITH THE SAME

(75) Inventors: Jin Kyu Lee, Busan (KR); Yongshik Shin, Daejeon (KR); BumHyun Lee, Seoul (KR); Dal Mo Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 658 days.

(21) Appl. No.: 12/842,662

(22) Filed: Jul. 23, 2010

(65) Prior Publication Data

US 2011/0045335 A1    Feb. 24, 2011

Related U.S. Application Data

(63) Continuation of application No. PCT/KR2010/001994, filed on Mar. 31, 2010.

(30) Foreign Application Priority Data

Apr. 1, 2009    (KR) .................. 10-2009-0027937

(51) Int. Cl.
*H01M 10/02*    (2006.01)
*H01M 10/40*    (2006.01)
*H01M 10/50*    (2006.01)

(52) U.S. Cl.
USPC ........... 429/157; 429/159; 429/179; 429/120; 429/178

(58) Field of Classification Search
USPC .......................... 429/157, 179, 159
See application file for complete search history.

(56) References Cited

U.S. PATENT DOCUMENTS

| | | | | |
|---|---|---|---|---|
| 6,881,514 | B2 * | 4/2005 | Ahn et al. | 429/99 |
| 8,420,251 | B2 * | 4/2013 | Watanabe et al. | 429/158 |
| 2003/0027043 | A1 * | 2/2003 | Benson et al. | 429/178 |
| 2008/0292952 | A1 | 11/2008 | Yanagihara et al. | |
| 2010/0304197 | A1 * | 12/2010 | Bhardwaj et al. | 429/94 |

FOREIGN PATENT DOCUMENTS

| | | | |
|---|---|---|---|
| EP | 1 333 520 A2 | 8/2003 | |
| EP | 1 343 211 A2 | 9/2003 | |
| JP | 2004-31161 A | 1/2004 | |
| JP | 2008-541386 A | 11/2008 | |
| KR | 10-2007-0112490 A | 11/2007 | |
| KR | 10-2008-0103002 A | 11/2008 | |
| KR | 10-2009-0000307 A | 1/2009 | |
| KR | 10-2009-0095525 A | 9/2009 | |
| WO | WO 2003/094258 A1 | 11/2003 | |
| WO | WO 2006/109610 A1 | 10/2006 | |
| WO | WO 2007/102672 A1 | 9/2007 | |

* cited by examiner

*Primary Examiner* — John S Maples
(74) *Attorney, Agent, or Firm* — Birch, Stewart, Kolasch & Birch, LLP

(57) ABSTRACT

Disclosed herein is a battery module having a plurality of plate-shaped battery cells which are sequentially stacked, wherein the battery module is configured in a structure in which two or more battery cell units are connected in series to each other in a state in which the battery cell units are stacked, each of the battery cell units is configured in a structure in which two or more battery cells are connected in parallel to each other in a state in which the battery cells are in tight contact with each other, the battery cells being mounted in housings, and external input and output terminals, i.e., a module cathode terminal and a module anode terminal, of the battery module are located at the same side or opposite sides of the battery module depending upon the number of the battery cell units constituting the battery module.

18 Claims, 7 Drawing Sheets

BATTERY MODULE HAVING FLEXIBILITY IN DESIGNING STRUCTURE OF MODULE AND BATTERY PACK EMPLOYED WITH THE SAME

This application is a Continuation of PCT International Application No. PCT/KR2010/001994 filed on Mar. 31, 2010, which claims the benefit of Patent Application No. 10-2009-0027937 filed in Republic of Korea, on April 2009. The entire contents of all of the above applications is hereby incorporated by reference into the present application.

TECHNICAL FIELD

The present invention relates to a battery module having flexibility in designing the structure of the module and a battery pack including the same, and, more particularly, to a battery module having a plurality of plate-shaped battery cells which are sequentially stacked, wherein the battery module is configured in a structure in which two or more battery cell units are connected in series to each other in a state in which the battery cell units are stacked, each of the battery cell units is configured in a structure in which two or more battery cells are connected in parallel to each other in a state in which the battery cells are in tight contact with each other, the battery cells being mounted in housings, and external input and output terminals, i.e., a module cathode terminal and a module anode terminal, of the battery module are located at the same side or opposite sides of the battery module depending upon the number of the battery cell units constituting the battery module.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle- or large-sized battery module. Especially, much interest is currently focused on the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

FIG. 1 is a perspective view typically illustrating a conventional representative pouch-shaped battery. A pouch-shaped battery 10 shown in FIG. 1 is configured in a structure in which two electrode terminals 11 and 12 protrude from the upper and lower ends of a battery body 13, respectively, while the electrode terminals 11 and 12 are opposite to each other.

A sheathing member 14 includes upper and lower sheathing parts. That is, the sheathing member 14 is a two-unit member. An electrode assembly (not shown) is received in a receiving part which is defined between the upper and lower sheathing parts of the sheathing member 14. The opposite sides 14b and the upper and lower ends 14a and 14c, which are contact regions of the upper and lower sheathing parts of the sheathing member 14, are bonded to each other, whereby the pouch-shaped battery 10 is manufactured. The sheathing member 14 is configured in a laminate structure of a resin layer/a metal film layer/a resin layer. Consequently, it is possible to bond the opposite sides 14b and the upper and lower ends 14a and 14c of the upper and lower sheathing parts of the sheathing member 14, which are in contact with each other, to each other by applying heat and pressure to the opposite sides 14b and the upper and lower ends 14a and 14c of the upper and lower sheathing parts of the sheathing member 14 so as to weld the resin layers thereof to each other. According to circumstances, the opposite sides 14b and the upper and lower ends 14a and 14c of the upper and lower sheathing parts of the sheathing member 14 may be bonded to each other using a bonding agent. For the opposite sides 14b of the sheathing member 14, the same resin layers of the upper and lower sheathing parts of the sheathing member 14 are in direct contact with each other, whereby uniform sealing at the opposite sides 14b of the sheathing member 14 is accomplished by welding. For the upper and lower ends 14a and 14c of the sheathing member 14, on the other hand, the electrode terminals 11 and 12 protrude from the upper and lower ends 14a and 14c of the sheathing member 14, respectively. For this reason, the upper and lower ends 14a and 14c of the upper and lower sheathing parts of the sheathing member 14 are thermally welded to each other, while a film-shaped sealing member 16 is interposed between the electrode terminals 11 and 12 and the sheathing member 14, in consideration of the thickness of the electrode terminals 11 and 12 and the difference in material between the electrode terminals 11 and 12 and the sheathing member 14, so as to increase sealability of the sheathing member 14.

However, the mechanical strength of the sheathing member 14 is low, and therefore, a plurality of battery cells (unit batteries) are mounted in a pack case, such as a cartridge, so as to manufacture a battery module having a stable structure. In this case, however, a device or a vehicle, in which a middle- or large-sized battery module is installed, has a limited installation space. Consequently, when the size of the battery module is increased due to the use of the pack case, such as the cartridge, space utilization is lowered. Also, due to their low mechanical strength, the battery cells repeatedly expand and contract during the charge and discharge of the battery cells, with the result that the thermally welded regions of the sheathing member may be easily separated from each other.

Meanwhile, battery cells constituting such a middle- or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof, with the result that it is difficult to effectively lower the overall temperature of the battery cells.

If the heat, generated from the battery module during the charge and discharge of the battery module, is not effectively removed, the heat accumulates in the battery module, with the result that the deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Each battery module mounted in a middle- or large-sized battery module is generally manufactured by stacking a plurality of battery cells with high integration. Electrode terminals of neighboring battery cells are electrically connected to each other.

FIG. 2 is a perspective view typically illustrating the electrical connection structure of a conventional representative battery module.

Referring to FIG. 2, a battery module 50 is configured in a structure in which a plurality of battery cell units 20 are connected in series to one another in a stacked manner, and two battery cells 10 are connected in series to each other in each of the battery cell units 20.

In the battery module 50, therefore, electrode terminals 11 and 12 of the battery module 40 are located at the same side irrespective of the number of the battery cell units 20, with the result that the battery module 50 is arranged in a restricted form.

Also, in a case in which the batteries are cooled in an air cooling manner, a flow space is formed in consideration of the structure of the battery module. For a battery module in which electrode terminals are located at the same side as described above, however, a cooling structure is also restricted.

Meanwhile, as demand for vehicle systems, such as electric vehicles and plug-in hybrid electric vehicles, requiring a high-capacity battery pack has increased, demand for high-power, large-capacity battery modules has also increased. On the other hand, the total capacity of the battery module 50 having the structure as shown in FIG. 2 is substantially decided based on each of the battery cells 10 constituting the battery cell units 20, with the result that manufacturing a desired large-capacity battery pack is limited.

Consequently, there is a high necessity for a battery module that provides high power and large-capacity and that can be flexibly configured based on a limited space and cooling structure.

DISCLOSURE

Technical Problem

Therefore, the present invention has been made to solve the above problems, and other technical problems that have yet to be resolved.

It is a first object of the present invention to provide a battery module configured in a structure in which a plurality of battery cell units each having battery cells connected in parallel to each other are connected in series to one another such that the battery module is arranged in various forms, and therefore, it is possible to provide a middle- or large-sized battery pack having minimized spatial restrictions and an effective cooling structure.

It is a second object of the present invention to provide a battery module including battery cell units which minimize the increase in weight and size of the battery module while effectively reinforcing low mechanical strength of battery cells.

It is a third object of the present invention to provide a middle- or large-sized battery pack including battery modules configured as described above.

Technical Solution

In accordance with one aspect of the present invention, the above and other objects can be accomplished by the provision of a battery module having a plurality of plate-shaped battery cells which are sequentially stacked, wherein the battery module is configured in a structure in which two or more battery cell units are connected in series to each other in a state in which the battery cell units are stacked, each of the battery cell units is configured in a structure in which two or more battery cells are connected in parallel to each other in a state in which the battery cells are in tight contact with each other, the battery cells being mounted in housings, and external input and output terminals, i.e., a module cathode terminal and a module anode terminal, of the battery module are located at the same side or opposite sides of the battery module depending upon the number of the battery cell units constituting the battery module.

Generally, a battery module is configured in a structure in which battery cell units are stacked in a state in which the battery cell units are connected in series to each other, and each of the battery cell units is configured in a structure in which battery cells are connected in series to each other. In this structure, however, external input and output terminals of the battery module are located at the same side of the battery module, with the result that it is not possible to flexibly design the overall structure of the battery module and the cooling structure of the battery module. Also, the capacity of the battery module is substantially decided based on the capacity of one battery cell, with the result that manufacturing a large-capacity battery module is limited.

On the other hand, the battery module according to the present invention is configured in a structure in which the battery cell units are connected in series to one another, the battery cells constituting each of the battery cell units are connected in parallel to each other. Therefore, it is possible to locate the external input and output terminals of the battery module at the same side or opposite sides of the battery module depending upon the number of the battery cell units. As a result, it is not possible to easily arrange the battery module based on a desired structure. Also, the capacity of the battery module is decided in proportion to the number of the battery cells constituting each of the battery cell units, and therefore, it is possible to manufacture a large-capacity battery module.

Each of the plate-shaped battery cells is a secondary battery having a small thickness and a relatively large width and length sufficient to minimize the overall size of the plate-shaped battery cells when the plate-shaped battery cells are stacked to constitute a battery module.

In a preferred example, each of the plate-shaped battery cells may be a secondary battery including an electrode assembly of a cathode/separator/anode structure mounted in a battery case formed of a laminate sheet including a resin layer and a metal layer, and the secondary battery may be configured in a structure in which a cathode terminal and an anode terminal protrude from opposite ends of the battery case. Specifically, each of the plate-shaped battery cells may be configured in a structure in which an electrode assembly is mounted in a pouch-shaped case formed of an aluminum laminate sheet. A secondary battery having the structure as described above may also be referred to as a pouch-shaped battery cell.

In another preferred example, each of the plate-shaped battery cells may be a prismatic battery cell including an electrode assembly of a cathode/separator/anode structure placed in a prismatic container together with an electrolyte in a hermetically sealed state. In this case, the prismatic battery cell may also be configured in a structure in which a cathode terminal and an anode terminal protrude from opposite ends of the prismatic container.

Meanwhile, as described above, each of the battery cell units may be configured in a structure in which two or more battery cells are mounted in the housings in a state in which the battery cells are connected in parallel to each other. Preferably, each of the battery cell units is configured in a structure in which two battery cells are connected in parallel to each other. It is preferable for each of the battery cell units to be configured in a hexahedral structure.

In a preferred example, the housings may be configured in a structure in which the housings are coupled to each other to surround the overall outside of the two or more battery cells which are in tight contact with each other ('a battery cell stack') excluding cathode and anode terminals of the battery cells. The housings protect the battery cells, the mechanical strength of which is low, and restrain the deformation of the battery cells due to repetitive expansion and contraction of the battery cells during the charge and discharge of the battery cells to prevent sealing portions of the respective battery cells from being separated from each other. Therefore, a material for the housings is not particularly restricted as long as the housings provide effects as described above. Preferably, the housings are made of metal.

Each of the housings has an internal structure corresponding to the outside shape of the battery cell stack. Preferably, the housings are coupled to each other in an assembly manner in which an additional coupling member is not used. For example, the housings may be configured in a structure in which section coupling parts of the housings are coupled to each other when the housings come into contact with each other in a state in which the housings face each other. Preferably, the housings are configured in a male and female coupling structure in which the section coupling parts of the housings are engaged with each other by elastic coupling when force is applied to the housings in a state in which the housings are in contact with each other in such a manner that the housings face each other. Concrete examples of the male and female coupling structure are illustrated in FIG. 5, to which the present invention is not limited.

Meanwhile, heat is generated from a secondary battery during the charge and discharge of the secondary battery, and effective discharge of the generated heat out of the secondary battery is very important in extending the life span of the secondary battery. For this reason, each of the housings is made of a metal sheet exhibiting high thermal conductivity, by which heat generated from the battery cells mounted in the housings is easily discharged outside.

In a preferred example, each of the housings may be provided at the outside thereof with a plurality of linear protrusions, which are spaced apart from one another in the longitudinal direction of each of the housings. Preferably, a projection is formed at an upper end protrusion, and another projection, which is formed in a shape reverse to the shape of the projection formed at the upper end protrusion, is formed at a lower end protrusion. When a plurality of battery modules are stacked, therefore, the projections of one battery module correspond to the projections of the neighboring battery module, thereby preventing the stacked position of the battery modules from being reversed or offset.

In this structure, each of the protrusions having the respective projections is preferably configured in a structure in which each of the protrusions is not continuous about a corresponding one of the projections. As a result, a coolant (for example, air) may flow not only in the lateral direction but also in the longitudinal direction of the housings in a state in which the battery modules are stacked, thereby further improving cooling efficiency.

According to circumstances, most of the protrusions may be configured in a structure in which the distance between opposite ends of each of the protrusions is smaller than the width of each of the housings such that the flow of air in the longitudinal direction is further accelerated.

The housings may be provided at opposite sides thereof with steps for achieving easy fixing of the battery module when the battery module is coupled to a predetermined frame member. Preferably, steps each having a predetermined size are formed at the opposite sides of the housings adjacent to the upper and lower ends thereof for achieving easy fixing of the battery module. According to circumstances, the steps are formed at the opposite sides of the housings adjacent to the left and right ends thereof. More preferably, steps are formed at not only the upper end lower ends but also the left and right ends of the housings for more secure fixing of the module.

Meanwhile, battery cells in a battery module are connected in series to each other, and a battery cell of a battery module and another battery cell of another neighboring battery module are connected in series to each other. In a preferred example, adjacent electrode terminals of battery cell units, which are surrounded by housings in a predetermined number, are coupled to each other in a state in which the battery cell units are stacked, to manufacture a plurality of battery modules.

Therefore, as previously described, the external input and output terminals of the battery module may be flexibly located depending upon the number of the battery cell units. For example, when the battery module includes an odd number of battery cell units, the module cathode terminal and the module anode terminal may be located at opposite sides of the battery module. On the other hand, when the battery module includes an even number of battery cell units, the module cathode terminal and the module anode terminal may be located at the same side of the battery module.

The electrode terminals of the battery cells may be coupled to each other using various methods, such as welding, soldering, and mechanical coupling. Preferably, the electrode terminals of the battery cells are coupled to each other by welding.

Meanwhile, a middle- or large-sized battery pack uses a plurality of battery modules to secure high power and large capacity. It is necessary for the battery modules constituting the battery pack to exhibit higher installation efficiency, higher structural stability, and higher heat dissipation efficiency for securing the safety of the battery pack in a limited installation space.

In accordance with another aspect of the present invention, therefore, there is provided a middle- or large-sized battery pack manufactured by combining the battery modules based on desired power and capacity.

The middle- or large-sized battery pack may be configured in various structures by arranging the battery modules in various forms. That is, the battery modules may be arranged in a lateral direction of each of the battery modules in a case in which an external input and output cathode terminal ('a module cathode terminal') of each of the battery modules and an external input and output anode terminal ('a module anode terminal') of each of the battery modules are located at the same side of each of the battery modules. On the other hand, the battery modules may be arranged in a longitudinal direction of each of the battery modules in a case in which the module cathode terminal and the module anode terminal are located at opposite sides of each of the battery modules. Also, the battery pack may be configured in a structure in which the battery modules are arranged simultaneously in a lateral direction and in a longitudinal direction of each of the battery modules.

In the middle- or large-sized battery pack configured in a structure in which the battery modules may be arranged in the longitudinal direction of each of the battery modules, it is preferable for the battery pack to be configured in an air cooling type cooling structure. More preferably, force to drive a coolant may be provided by a suction fan.

That is, in the structure in which the battery modules may be arranged in the longitudinal direction of each of the battery modules, it is possible to easily use a suction type cooling structure, which is not applicable to a conventional battery pack arranged in the lateral direction due to sealability and the flow direction of a coolant, and therefore, it is possible to prevent the generation of loud noise caused in a blowing type cooling structure Since the battery pack according to the present invention is configured in an air cooling type cooling structure, as previously described, flexible arrangement of the battery modules in the longitudinal direction and the lateral direction thereof is possible depending upon the characteristics and constructions of the battery modules. Such flexible constructions of the battery modules enable various designs with respect to factors related to the installation position of a cooling fan and the air flow structure, which is very much preferred.

According to circumstances, the battery pack may be configured in a water cooling type cooling structure in which force to drive a coolant is provided by a suction pump.

A middle- or large-sized battery system according to the present invention may be manufactured by combining the battery packs based on desired power and capacity. The battery system may be used in electric vehicles, hybrid electric vehicles, or plug-in hybrid electric vehicles, which have a limited installation space, in consideration of installation efficiency, structural stability, and cooling efficiency. In particular, the battery system according to the present invention is more preferably used in the electric vehicles or the plug-in hybrid electric vehicles, which require high power and large capacity.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

FIGS. 3 to 6 are views typically illustrating a series of processes for assembling a battery unit cell according to an embodiment of the present invention.

Figure 1:
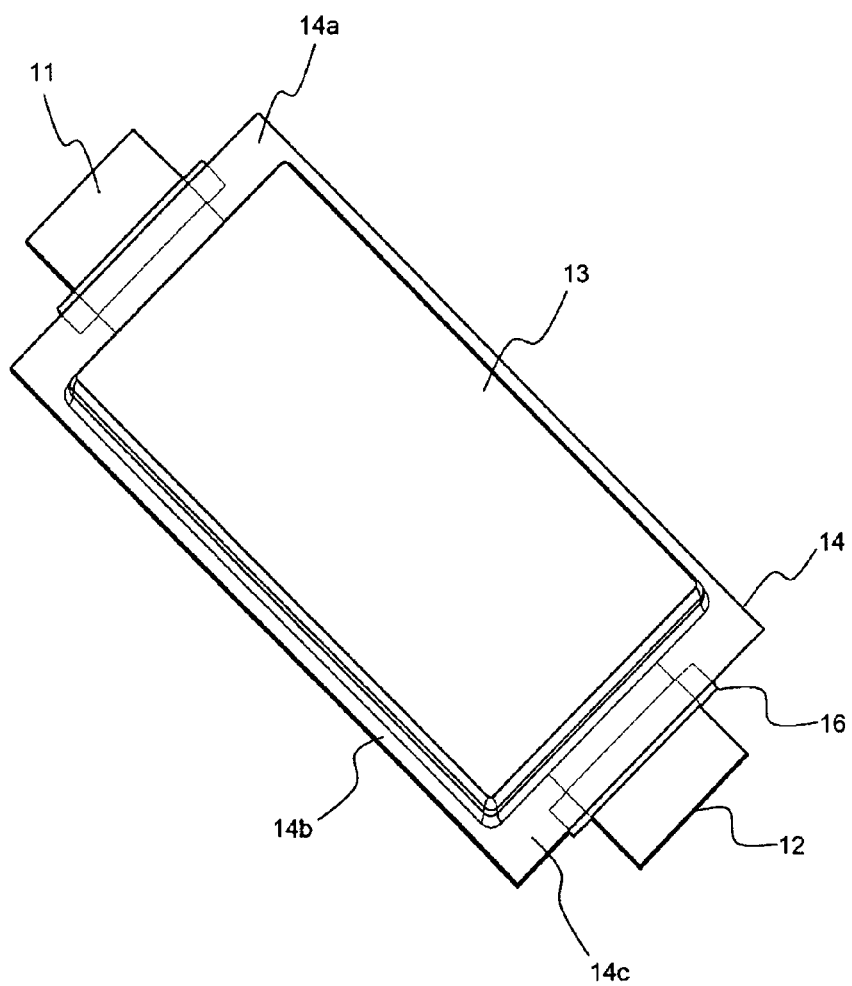
FIG. 1 is a perspective view illustrating a conventional representative pouch-shaped battery.
Figure 2:
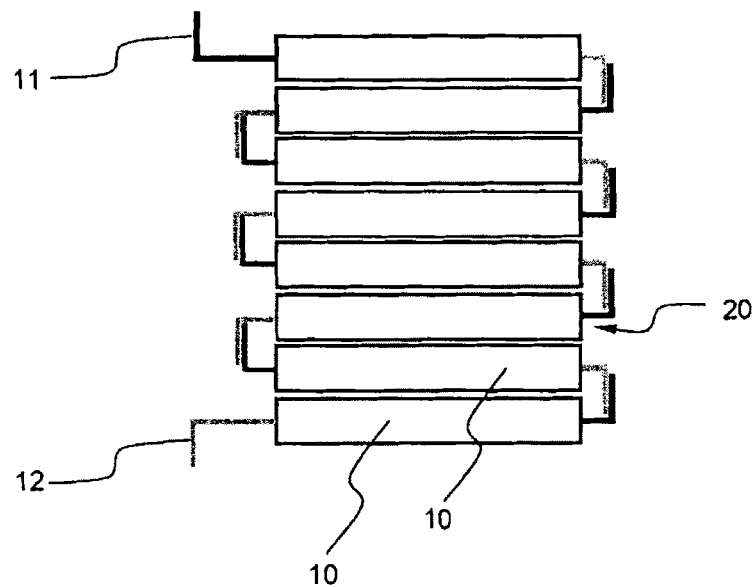
FIG. 2 is a perspective view illustrating the electrical connection structure of a conventional representative battery module.
Figure 3:
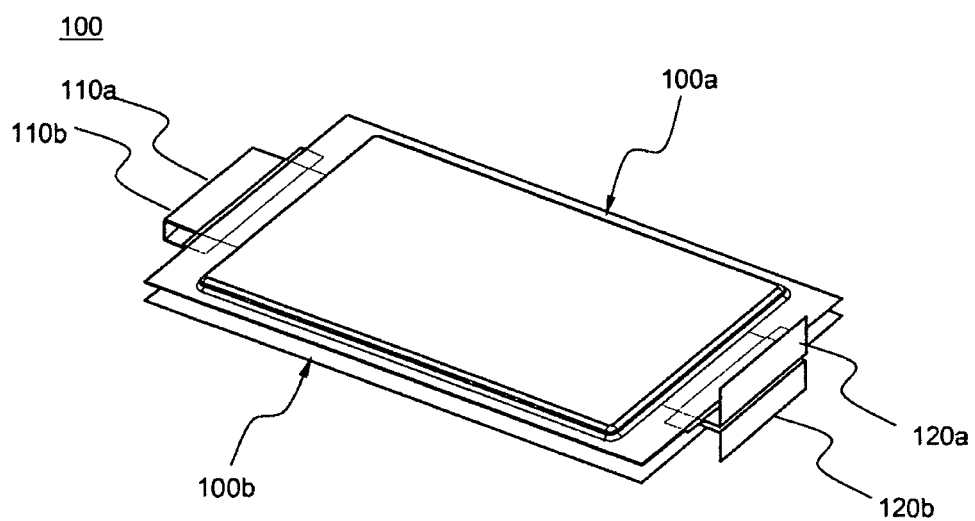
FIGS. 3 to 6 are typical views illustrating a series of processes for assembling a battery unit cell according to an embodiment of the present invention.

Referring first to FIG. 3, two pouch-shaped battery cells 100a and 100b are stacked such that cathode terminals 110a and 110b are overlapped and anode terminals 120a and 120b are overlapped, and the overlapped electrode terminals are connected in parallel with each other by welding.

Figure 4:
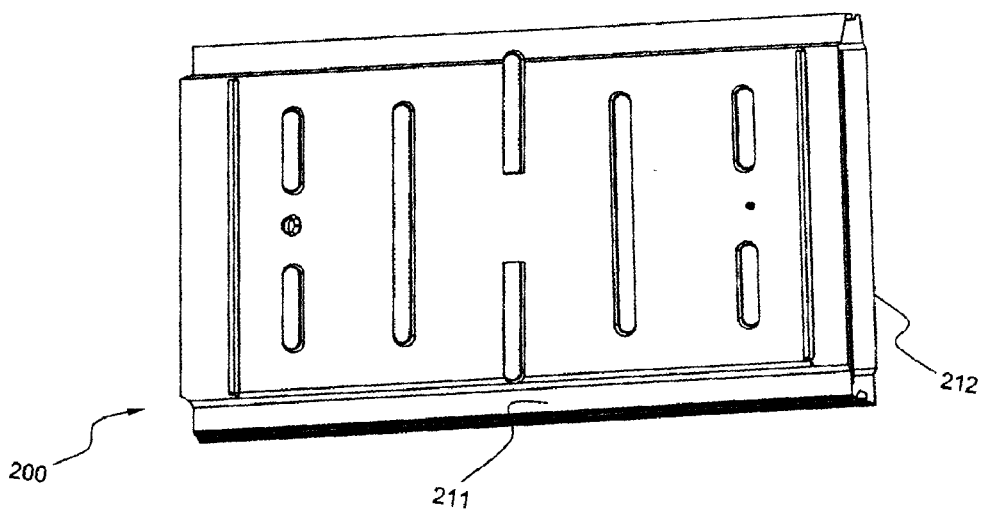

FIG. 4 shows a high-strength metal housing configured to surround the overall outside of a battery cell stack 100 of FIG. 3. The metal housing 200 protects the battery cells, the mechanical strength of which is low, and restrains the deformation of the battery cells due to repetitive expansion and contraction of the battery cells during the charge and discharge of the battery cells to prevent the sealing portions of the respective battery cells from being separated from each other. The metal housing 200 includes a pair of left and right housings 211 and 212. The left housing 211 and the right housing 212 may be coupled to each other without using an additional coupling member.

Figure 5:
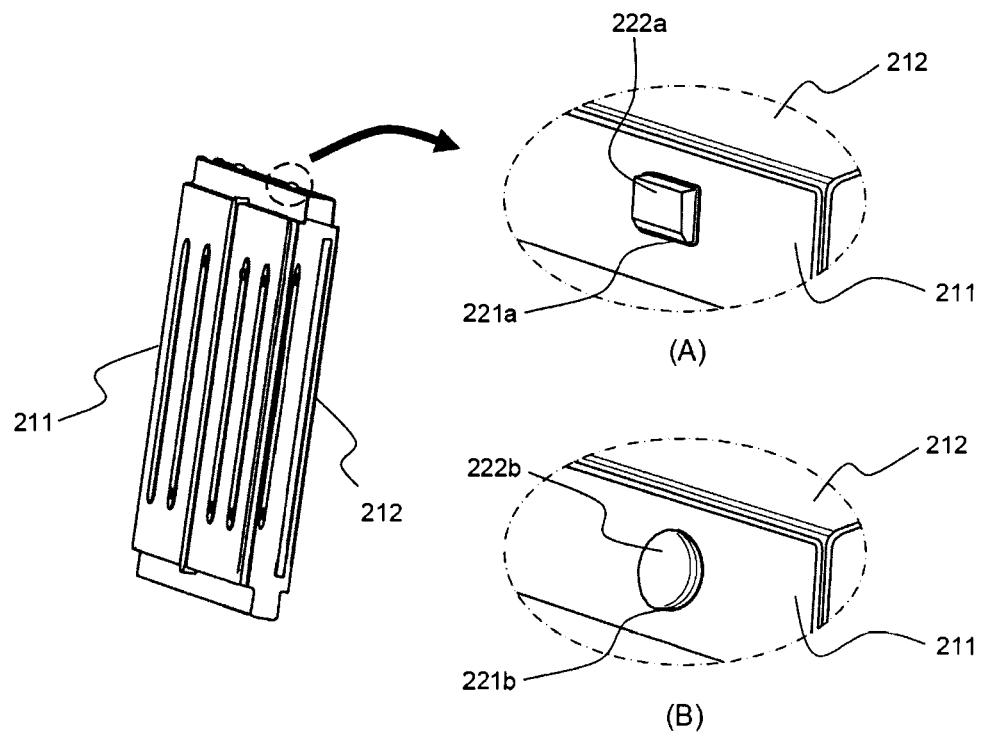

The coupling structure of the metal housing 200 is shown in detail in FIG. 5. FIG. 5 is a sectional view of the metal housing 200 including partially enlarged views of the metal housing 200. Referring to FIG. 5, the metal housings 211 and 212 are coupled to each other in a male and female coupling structure, in which the metal housings 211 and 212 are engaged with each other by elastic coupling when force is applied to the metal housings 211 and 212 in a state in which the metal housings 211 and 212 are in contact with each other in such a manner that the metal housings 211 and 212 face each other.

The male and female coupling structure may be configured as shown in FIG. 5(A), in which a quadrangular coupling protrusion 222a formed at the metal housing 212 is coupled in a quadrangular coupling hole 221a formed in the metal housing 211. Alternatively, the male and female coupling structure may be configured as shown in FIG. 5(B), in which a hemispherical coupling protrusion 222b formed at the metal housing 212 is coupled in a circular coupling hole 221b formed in the metal housing 211.

During the coupling between the metal housings, the quadrangular coupling protrusion 222a or the hemispherical coupling protrusion 222b is engaged into the quadrangular coupling hole 221a or the circular coupling hole 221b, with the result that the quadrangular coupling protrusion 222a or the hemispherical coupling protrusion 222b is securely coupled in the quadrangular coupling hole 221a or the circular coupling hole 221b, thereby providing high coupling force. Consequently, it is possible to achieve strong mechanical coupling between the metal housings without providing an additional coupling member or performing an additional coupling member manufacturing process in order to assemble the metal housings 211 and 212. Such a simple coupling structure is particularly suitable for mass production.

However, it should be noted that the male and female coupling structure is not limited to the shapes as shown in FIGS. 5(A) and 5(B).

Figure 6:
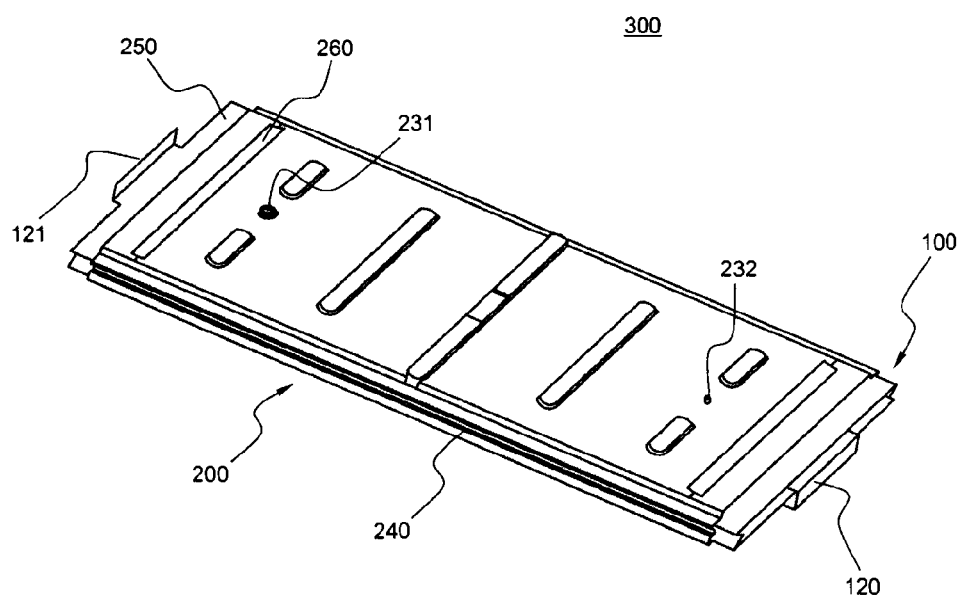

FIG. 6 is a perspective view illustrating an exemplary battery cell unit according to an embodiment of the present invention.

Referring to FIG. 6, the a battery cell unit 300 is configured in a structure in which a battery cell stack including stacked battery cells 100 is mounted in a metal housing 200 to complement low mechanical strength of the battery cells 100. At one side of each of the battery cells, cathode terminals 120 of the respective battery cells are connected in parallel to each other by welding, and bent in a '[' shape. At the other side of each of the battery cells, anode terminals 121 of the respective battery cells are bent outward such that the anode terminals 121 of the respective battery cells are coupled to corresponding electrode terminals of neighboring battery cell units.

The metal housing 200 includes a pair of high-strength metal sheets, which are coupled to each other in such a manner that the overall outside of the battery cell stack is surrounded by the metal sheets excluding the electrode terminals of the battery cells. The metal housing 200 is provided at the left and right sides thereof with steps 240 for achieving easy fixing of the battery cell unit. Also, the metal housing 200 is provided at the upper and lower ends thereof with steps 250 for achieving easy fixing of the battery cell unit. In addition, the metal housing 200 is provided at regions adjacent to the upper and lower ends thereof with lateral fixing parts 260 for achieving easy stacking of the battery cell unit. At the outside of the metal housing 200 are formed a plurality of linear protrusions, which are spaced apart from one another in the longitudinal direction of the battery cell unit. A projection 231 is formed at an upper end protrusion. Another projection 232, which is configured in a shape reverse to the shape of the projection 231, is formed at a lower end protrusion.

Figure 7:
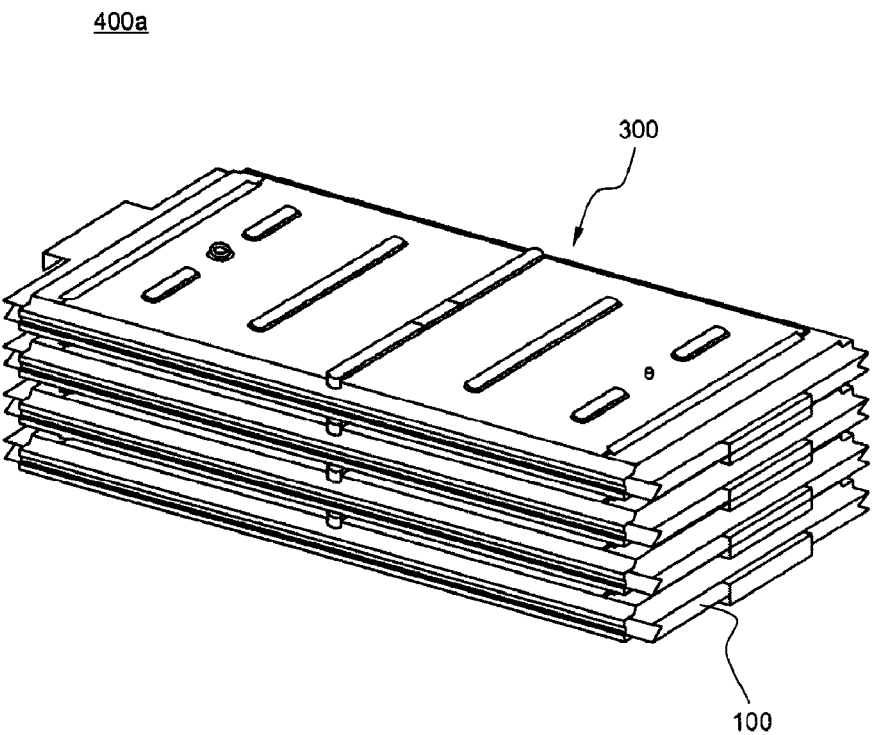
FIG. 7 is a perspective view illustrating a battery module according to an embodiment of the present invention.

FIG. 7 is a perspective view illustrating a battery module 400 including a plurality of stacked battery cell units 300.

Referring to FIG. 7, the battery module 400 according to the present invention includes four battery cell units 300, i.e., eight battery cells 100.

Figure 8:
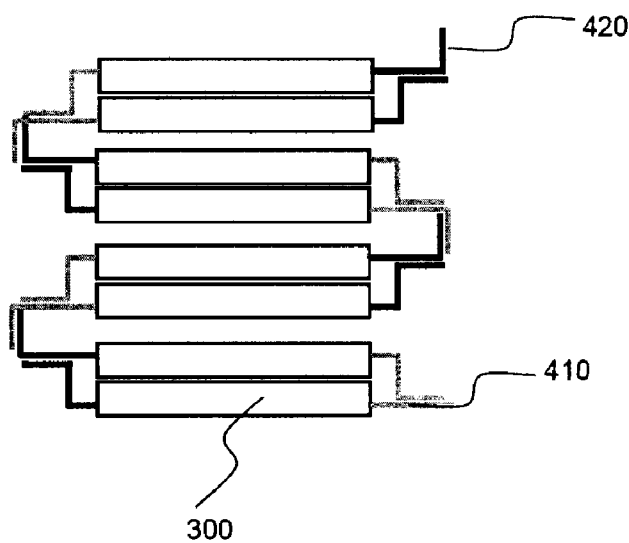
FIG. 8 is a typical view illustrating the electrical connection structure of a battery module having an even number of battery cell units coupled to one another according to an embodiment of the present invention.
Figure 9:
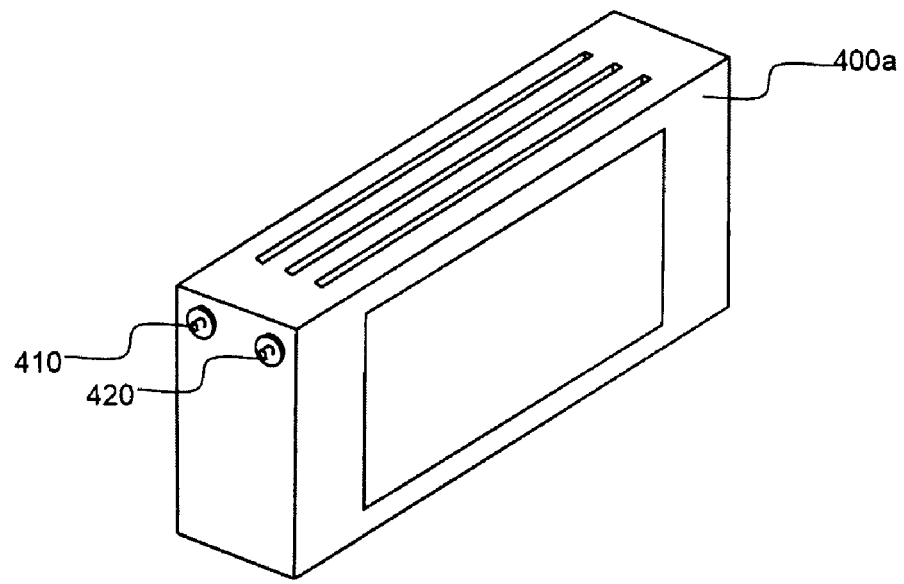
FIG. 9 is a perspective view illustrating the battery module of FIG. 8 mounted in a battery pack frame.

FIG. 8 is a typical view illustrating the electrical connection structure of a battery module having an even number of battery cell units are coupled to one another, and FIG. 9 is a perspective view typically illustrating the battery module of FIG. 8 mounted in a battery pack frame.

Referring to these drawings, a battery module 400a includes four battery cell units 300. The respective battery cell units 300 are connected in series to one another such that a module cathode terminal 410 and a module anode terminal 420 are located at the same side of the battery module 400a.

Figure 10:
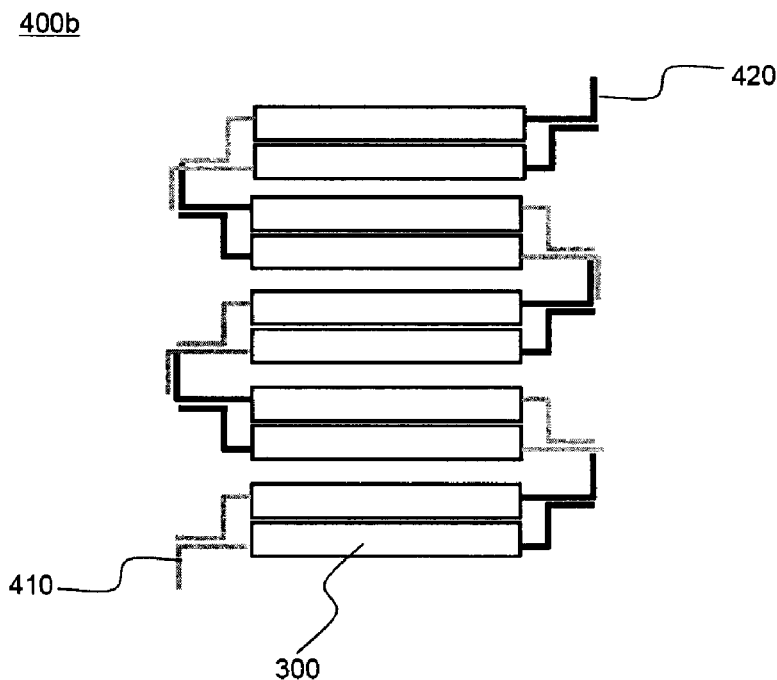
FIG. 10 is a typical view illustrating the electrical connection structure of a battery module having an odd number of battery cell units coupled to one another according to another embodiment of the present invention.
Figure 11:
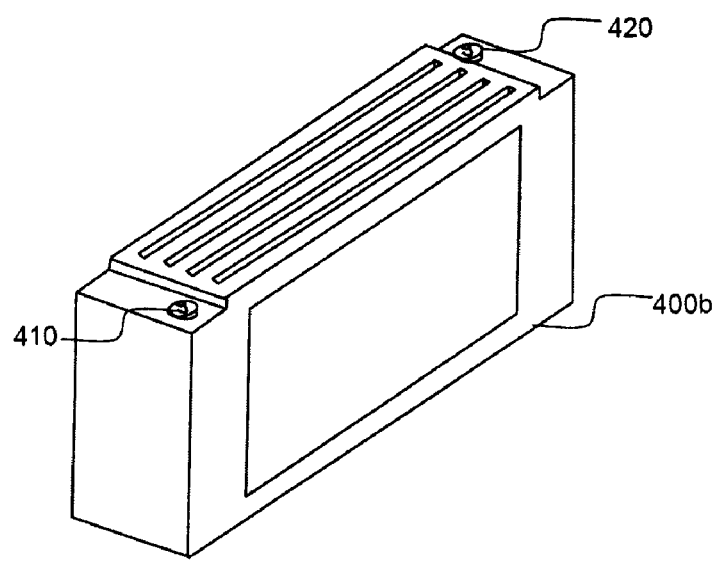
FIG. 11 is a perspective view illustrating the battery module of FIG. 10 mounted in a battery pack frame.

FIG. 10 is a typical view illustrating the electrical connection structure of a battery module having an odd number of battery cell units are coupled to one another, and FIG. 11 is a perspective view typically illustrating the battery module of FIG. 10 mounted in a battery pack frame.

Referring to these drawings, a battery module 400b includes five battery cell units 300. The respective battery cell units 300 are connected in series to one another such that a module cathode terminal 410 and a module anode terminal 420 are located at opposite sides of the middle- or large-sized battery module 400b.

Therefore, it is possible to flexibly locate the external input and output terminals, i.e., the module cathode terminal 410 and the module anode terminal 420, of the battery module 400a; 400b depending upon the number of the battery cell units 300 constituting the battery module 400a; 400b.

Figure 12:
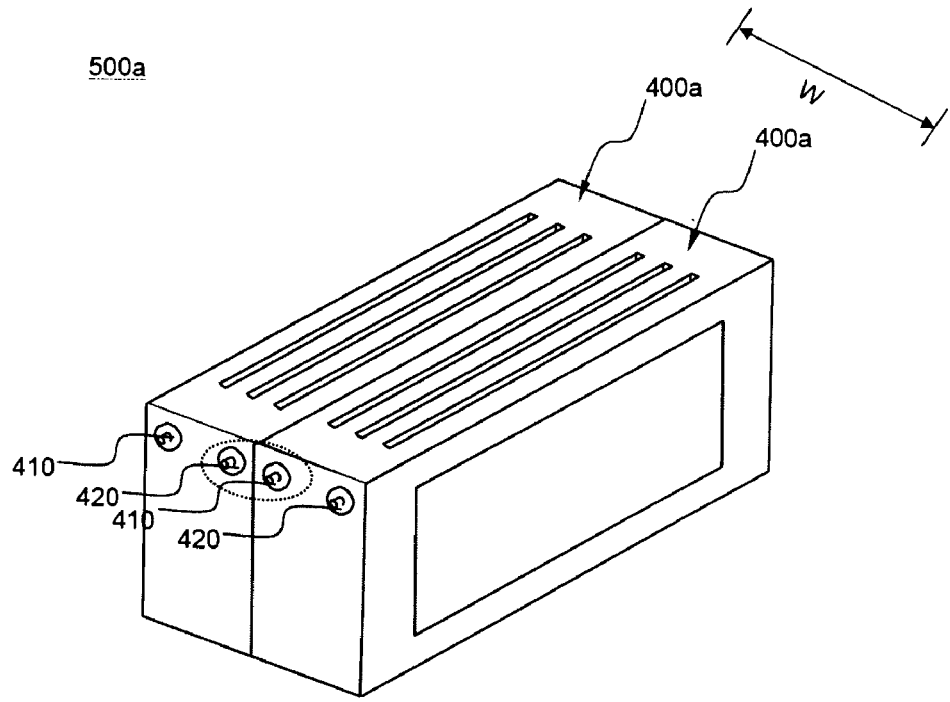
FIG. 12 is a perspective view illustrating a middle- or large-sized battery pack manufactured by stacking a plurality of battery modules, one of which is shown in FIG. 9.

FIG. 12 is a perspective view typically illustrating a middle- or large-sized battery pack manufactured by interconnecting a plurality of battery modules, one of which is shown in FIG. 9.

Referring to FIG. 12, a middle- or large-sized battery pack 500a includes two battery modules 400a arranged adjacent to each other. A module cathode terminal 410 and a module anode terminal 420 of each of the battery modules 400a are located at the same side of each of the battery modules 400a. The battery modules 400a are connected to each other in a state in which the battery modules 400a are arranged in the lateral direction W of each of the battery modules 400a.

Figure 13:
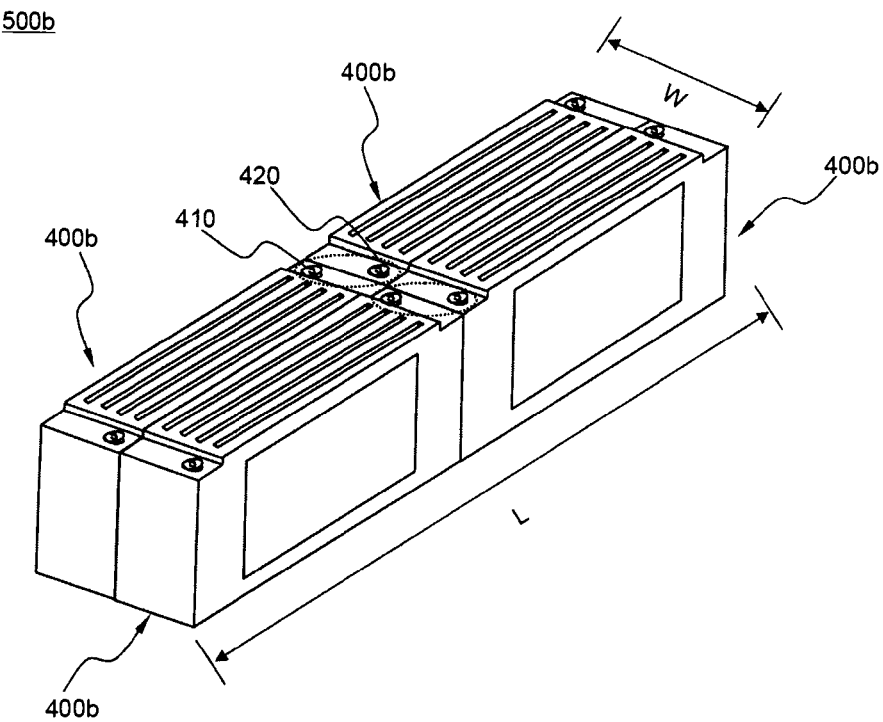
FIG. 13 is a perspective view illustrating a middle- or large-sized battery pack manufactured by stacking a plurality of battery modules, one of which is shown in FIG. 11.

FIG. 13 is a perspective view illustrating a middle- or large-sized battery pack manufactured by stacking a plurality of battery modules, one of which is shown in FIG. 11.

Referring to FIG. 13, a middle- or large-sized battery pack 500b includes four middle- or large-sized battery modules 400b arranged adjacent to one another. A module cathode terminal 410 and a module anode terminal 420 of each of the battery modules 400ba are located at the same side of each of the battery modules 400a. The battery modules 400b are connected to one another in a state in which the battery modules 400a are arranged in the lateral direction W and in the longitudinal direction L of each of the middle- or large-sized battery modules 400b.

In this structure, the middle- or large-sized battery pack 500b is arranged in the longitudinal direction L in the same direction as the flow direction of a coolant, with the result that it is possible to easily use a suction type cooling structure (not shown), which is not applicable to the middle- or large-sized battery pack 500b arranged in the lateral direction W, and therefore, it is possible to manufacture a middle- or large-sized battery pack having low noise while providing a desired cooling structure.

Also, a plurality of battery modules 400a and 400b may be connected to one another according to a desired structure, thereby manufacturing a middle- or large-sized battery pack having larger power and larger capacity.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured in a structure in which battery cells are connected in parallel to each other to constitute a battery cell unit, which minimizes the increase in weight and size of the battery module while effectively reinforcing low mechanical strength of the battery cells, and a plurality of battery cell units are connected in series to one another to constitute a battery module having a flexible structure in the lateral direction thereof and in the longitudinal direction thereof depending upon the number of the battery cell units, thereby providing a battery pack that is capable of providing high power and large capacity while minimizing spatial restrictions and providing an effective cooling structure.

The invention claimed is:
1. A battery module having a plurality of plate-shaped battery cells which are sequentially stacked, wherein the battery module is configured in a structure in which two or more battery cell units are connected in series to each other so that the battery cell units are stacked, each of the battery cell units is configured in a structure in which two or more battery cells are connected in parallel to each other in a state in which the battery cells are in tight contact with each other, the battery cells being mounted in a housing, and external input and output terminals of the battery module composed of a module cathode terminal and a module anode terminal are both located at a same side of the battery module or opposite sides of the battery module depending upon the number of the battery cell units constituting the battery module, wherein the housings are coupled to each other to surround an overall outside of a battery cell stack constituted by the two or more battery cells excluding cathode and anode terminals of the battery cells.

2. The battery module according to claim 1, wherein each of the plate-shaped battery cells is a pouch-shaped battery cell including an electrode assembly of a cathode/separator/anode structure mounted in a battery case formed of a laminate sheet including a resin layer and a metal layer, the pouch-shaped battery cell being configured in a structure in which a cathode terminal and an anode terminal protrude from opposite ends of the battery case.

3. The battery module according to claim 1, wherein each of the plate-shaped battery cells is a prismatic battery cell including an electrode assembly of a cathode/separator/anode structure placed in a prismatic container together with an electrolyte in a hermetically sealed state, the prismatic battery cell being configured in a structure in which a cathode terminal and an anode terminal protrude from opposite ends of the prismatic container.

4. The battery module according to claim 1, wherein each of the battery cell units is configured in a structure in which two battery cells are connected in parallel to each other.

5. The battery module according to claim 1, wherein each of the housings has an internal structure corresponding to an outside shape of the battery cell stack, and the housings are coupled to each other in an assembly manner.

6. The battery module according to claim 5, wherein the housings are configured in a structure in which section coupling parts of the housings are coupled to each other when the housings come into contact with each other in a state in which the housings face each other.

7. The battery module according to claim 6, wherein the housings are configured in a male and female coupling structure in which the section coupling parts of the housings are engaged with each other by elastic coupling when force is applied to the housings in a state in which the housings are in contact with each other in such a manner that the housings face each other.

8. The battery module according to claim 1, wherein each of the housings is made of a metal sheet exhibiting high thermal conductivity.

9. The battery module according to claim 1, wherein the battery module includes an odd number of battery cell units, and the module cathode terminal and the module anode terminal are located at the opposite sides of the battery module from each other.

10. The battery module according to claim 1, wherein the battery module includes an even number of battery cell units, and the module cathode terminal and the module anode terminal are both located at the at a same side of the battery module.

11. The battery module according to claim 1, wherein neighboring electrode terminals of the battery cells are coupled to each other by welding or soldering.

12. A middle- or large-sized battery pack including two or more battery modules according to claim 1 based on power and capacity.

13. The middle- or large-sized battery pack according to claim 12, wherein the battery pack is configured in a structure in which the battery modules are arranged adjacent to each other, and the battery modules are arranged in a lateral direction of each of the battery modules in a case in which a module cathode terminal and a module anode terminal are located at the same side of each of the battery modules.

14. The middle- or large-sized battery pack according to claim 12, wherein the battery pack is configured in a structure in which the battery modules are arranged adjacent to each other, and the battery modules are arranged in a longitudinal direction of each of the battery modules in a case in which a module cathode terminal and a module anode terminal are located at opposite sides of each of the battery modules.

15. The middle- or large-sized battery pack according to claim 14, wherein the battery pack is configured in a structure in which the battery modules are arranged simultaneously in a lateral direction and in a longitudinal direction of each of the battery modules.

16. The middle- or large-sized battery pack according to claim 14, wherein the battery pack is configured in an air cooling type cooling structure in which force to drive a coolant is provided by a suction fan.

17. The middle- or large-sized battery pack according to claim 14, wherein the battery pack is configured in a water cooling type cooling structure in which force to drive a coolant is provided by a suction pump.

18. The middle- or large-sized battery pack according to claim 12, wherein the battery pack is used as a power source for electric vehicles, hybrid electric vehicles, or plug-in hybrid electric vehicles.

* * * * *